(12) United States Patent
Imai et al.

(10) Patent No.: US 11,598,715 B2
(45) Date of Patent: Mar. 7, 2023

(54) DETECTION APPARATUS AND METHOD OF PRODUCING ELECTRONIC APPARATUS

(71) Applicant: SONY CORPORATION, Tokyo (JP)

(72) Inventors: Yasunori Imai, Kanagawa (JP); Yasuyuki Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 192 days.

(21) Appl. No.: 16/764,793

(22) PCT Filed: Oct. 11, 2018

(86) PCT No.: PCT/JP2018/037921
§ 371 (c)(1),
(2) Date: May 15, 2020

(87) PCT Pub. No.: WO2019/102734
PCT Pub. Date: May 31, 2019

(65) Prior Publication Data
US 2021/0372778 A1    Dec. 2, 2021

(30) Foreign Application Priority Data
Nov. 24, 2017    (JP) ............................ JP2017-225918

(51) Int. Cl.
*G01B 11/24*    (2006.01)
*G01N 21/21*    (2006.01)
(Continued)

(52) U.S. Cl.
CPC ............ *G01N 21/21* (2013.01); *G01B 11/24* (2013.01); *G01J 4/04* (2013.01); *G01N 21/958* (2013.01)

(58) Field of Classification Search
CPC ..... G01N 2021/217; G01N 2021/8841; G01N 2021/8845; G01N 2021/8848;
(Continued)

(56) References Cited

U.S. PATENT DOCUMENTS 4,909,630 A * 3/1990 Gawrisch ........... G01B 11/0691
                                                                 264/408
5,243,185 A    9/1993 Blackwood
(Continued)

FOREIGN PATENT DOCUMENTS

CN    101223436 A    7/2008
CN    102017601 A    4/2011
(Continued)

OTHER PUBLICATIONS

Office Action for CN Patent Application No. 201880074043.0, dated Aug. 16, 2021, 10 pages of Office Action and 13 pages of English Translation.

(Continued)

*Primary Examiner* — Gordon J Stock, Jr.
(74) *Attorney, Agent, or Firm* — Chip Law Group

(57) ABSTRACT

A detection apparatus according to an embodiment of the present technology includes: an imaging unit; an illumination unit; a polarization control unit; and a generation unit. The imaging unit generates image data on the basis of incident light. The illumination unit illuminates a subject with linearly polarized light. The polarization control unit controls a polarization state of light to be detected, the light to be detected travelling toward the imaging unit. The generation unit generates information regarding a degree of linear polarization of the light to be detected, on the basis of image data regarding the light to be detected, the polarization state of the light to be detected having been controlled, the image data regarding the light to be detected being generated by the imaging unit.

12 Claims, 9 Drawing Sheets

(51) Int. Cl.
*G01N 21/958* (2006.01)
*G01J 4/04* (2006.01)

(58) Field of Classification Search
CPC .... G01N 21/21; G01N 21/88; G01N 21/8803;
G01N 21/8806; G01N 21/896; G01N
21/8914; G01N 21/90; G01N 21/94;
G01N 21/95; G01N 21/958; G01B 11/24;
G01B 11/2433; G01J 3/36; G01J 3/2803;
G01J 3/51; G01J 3/513; G01J 5/58; G01J
4/04; G01J 4/00; G01J 4/02; G01J
2004/001; G01J 2004/002; G01J
2004/004; G01J 2004/0005; G01J
2004/007; G01J 2004/008; G01J
2005/586; G01J 2003/2826; G01J
2003/2806; G01J 2003/2813; G01J
2003/2809; G01J 2003/2816; G01J
2003/282; G01J 2003/516; G02B 27/285;
G02B 27/286; G02B 27/287; G02B
5/201; H01L 27/14649
See application file for complete search history.

(56) References Cited

U.S. PATENT DOCUMENTS

| | | | | |
|---|---|---|---|---|
| 5,305,090 A * | 4/1994 | Kowalski | ............... | G01N 21/23 356/365 |
| 5,828,500 A * | 10/1998 | Kida | ............... | G01M 11/02 359/799 |
| 6,067,155 A * | 5/2000 | Ringlien | ............... | G01N 21/21 356/240.1 |
| 6,647,162 B2 * | 11/2003 | Kim | ............... | G01L 1/242 356/73.1 |
| 6,810,141 B2 * | 10/2004 | Barbour | ............... | G06K 9/00 382/103 |
| 7,061,612 B2 * | 6/2006 | Johnston | ............... | G01J 4/00 356/364 |
| 7,580,122 B2 * | 8/2009 | Huang | ............... | G01B 11/168 356/124 |
| 7,715,590 B2 * | 5/2010 | Whitaker | ............... | G01J 4/04 359/483.01 |
| 7,760,256 B2 * | 7/2010 | Kanamori | ............... | G01J 3/2803 348/222.1 |
| 8,025,408 B2 * | 9/2011 | Sato | ............... | H04N 9/04557 353/121 |
| 8,184,194 B2 * | 5/2012 | Sato | ............... | H04N 5/2256 353/121 |
| 9,080,986 B2 * | 7/2015 | Hirai | ............... | G01N 21/84 |
| 9,867,559 B2 * | 1/2018 | Sato | ............... | A61B 5/14552 |
| 10,362,280 B2 * | 7/2019 | Kondo | ............... | G02B 5/3025 |
| 10,366,303 B2 * | 7/2019 | Kondo | ............... | G02B 5/3025 |
| 10,444,617 B2 * | 10/2019 | Nakatani | ............... | G06F 3/01 |
| 10,529,076 B2 * | 1/2020 | Lu | ............... | G06T 7/579 |
| 2003/0015673 A1 | 1/2003 | Luxem | | |
| 2005/0264813 A1 * | 12/2005 | Giakos | ............... | G01J 4/04 356/369 |
| 2008/0204733 A1 * | 8/2008 | Jones | ............... | G01N 33/12 356/237.1 |
| 2010/0283883 A1 | 11/2010 | Sato et al. | | |
| 2010/0283885 A1 * | 11/2010 | Lin | ............... | G02B 5/3025 348/340 |
| 2010/0303344 A1 * | 12/2010 | Sato | ............... | H04N 9/0451 382/162 |
| 2013/0123985 A1 | 5/2013 | Hirai et al. | | |
| 2013/0208104 A1 | 8/2013 | Goodwin et al. | | |
| 2014/0063299 A1 * | 3/2014 | Fest | ............... | H04N 9/04557 348/E5.091 |
| 2015/0226542 A1 * | 8/2015 | Sakashita | ............... | G01B 11/168 356/33 |
| 2016/0267348 A1 * | 9/2016 | Kondo | ............... | G06T 7/73 |

FOREIGN PATENT DOCUMENTS

| | | |
|---|---|---|
| CN | 102203700 A | 9/2011 |
| CN | 102753933 A | 10/2012 |
| EP | 2293541 A1 | 3/2011 |
| EP | 2536997 A1 | 12/2012 |
| JP | 63-132142 A | 6/1988 |
| JP | 63-132143 A | 6/1988 |
| JP | 04-236344 A | 8/1992 |
| JP | 1992-236344 A | 8/1992 |
| JP | 07-294663 A | 11/1995 |
| JP | 2002-098650 A | 4/2002 |
| JP | 2002098650 A * | 4/2002 |
| JP | 4435865 B2 | 3/2010 |
| JP | 2010-107475 A | 5/2010 |
| JP | 2011-164061 A | 8/2011 |
| JP | 2011-196741 A | 10/2011 |
| KR | 10-2012-0104635 A | 9/2012 |
| WO | 2009/157129 A1 | 12/2009 |
| WO | 2011/099404 A1 | 8/2011 |
| WO | 2011/115256 A1 | 9/2011 |
| WO | WO-2018216349 A1 * 11/2018 | ............... G01J 1/02 |

OTHER PUBLICATIONS

International Search Report and Written Opinion of PCT Application No. PCT/JP2018/037921, dated Dec. 25, 2018, 08 pages of ISRWO.

* cited by examiner

DETECTION APPARATUS AND METHOD OF PRODUCING ELECTRONIC APPARATUS

CROSS REFERENCE TO RELATED APPLICATIONS

This application is a U.S. National Phase of International Patent Application No. PCT/JP2018/037921 filed on Oct. 11, 2018, which claims priority benefit of Japanese Patent Application No. JP 2017-225918 filed in the Japan Patent Office on Nov. 24, 2017.

TECHNICAL FIELD

The present technology relates to a detection apparatus applicable to, for example, assembling and inspection of an electronic apparatus, and a method of producing an electronic apparatus.

BACKGROUND ART

Patent Literature 1 discloses a visual inspection apparatus for accurately inspecting the outer shape of a film-like transparent plate or the like. In this visual inspection apparatus, first and second polarization plates are disposed on an optical path between a light source and an imaging apparatus so as to have a crossed Nicols relationship. Then, an inspection target is disposed between the first and second polarization plates. As a result, a difference occurs between the amount of light that does not pass through the inspection target and the amount of light that passes through the inspection target, and a grayscale image in which the background portion is dark and the inspection target is bright is generated. By binarizing this grayscale image, it is possible to accurately inspect the outer shape of the inspection target (see, for example, [0009] to [0014] of the specification and FIG. 1 to FIG. 3 of Patent Literature 1).

CITATION LIST

Patent Literature

Patent Literature 1: Japanese Patent Application Laid-open No. 1992-236344

DISCLOSURE OF INVENTION

Technical Problem

As described above, there is a need for a technology capable of detecting the outer shape and the like of a transparent subject having transparency with high accuracy.

In view of the circumstances as described above, it is an object of the present technology to provide a detection apparatus capable of detecting even the outer shape and the like of a subject having transparency with high accuracy, and a method of producing an electronic apparatus.

Solution to Problem

In order to achieve the above-mentioned object, a detection apparatus according to an embodiment of the present technology includes: an imaging unit; an illumination unit; a polarization control unit; and a generation unit.

The imaging unit generates image data on a basis of incident light.

The illumination unit illuminates a subject with linearly polarized light.

The polarization control unit controls a polarization state of light to be detected, the light to be detected travelling toward the imaging unit.

The generation unit generates information regarding a degree of linear polarization of the light to be detected, on a basis of image data regarding the light to be detected, the polarization state of the light to be detected having been controlled, the image data regarding the light to be detected being generated by the imaging unit.

In this detection apparatus, a subject is illuminated with linearly polarized light, and a polarization state of light to be detected is controlled, the light to be detected travelling toward the imaging unit. Further, information regarding a degree of linear polarization of the light to be detected is generated, on a basis of image data regarding the light to be detected, the polarization state of the light to be detected having been controlled, the image data regarding the light to be detected being generated by the imaging unit. By using the information regarding the degree of linear polarization, it is possible to detect even the outer shape and the like of a subject having transparency with high accuracy.

The information regarding the degree of linear polarization may include at least one of a maximum value of intensity of linearly polarized light components included in the light to be detected, a minimum value of intensity of the linearly polarized light components included in the light to be detected, or the degree of linear polarization.

The imaging unit may include a plurality of pixels each generating pixel data. In this case, the polarization control unit may classify the plurality of pixels into a plurality of groups, and controls the polarization state of the light to be detected for each of the classified groups, each of the plurality of groups including a predetermined number of pixels. Further, the generation unit may generate the information regarding the degree of linear polarization for each of the classified groups.

The polarization control unit may include a plurality of polarization devices that is disposed corresponding to the predetermined number of pixels for each of the classified groups and controls the polarization state of the light to be detected, which travels toward a corresponding one of the predetermined number of pixels.

Each of the plurality of polarization devices may extract a linearly polarized light component having a different polarization direction with respect to incident light.

The predetermined number of pixels may include first to fourth pixels arranged two by two in directions orthogonal to each other. In this case, the plurality of polarization devices may include first to fourth polarization devices arranged corresponding to the first to fourth pixels.

The first polarization device may extract a linearly polarized light component having a first polarization direction from the light to be detected. In this case, the second polarization device may extract a linearly polarized light component having a second polarization direction from the light to be detected, the second polarization direction being obtained by rotating the first polarization direction in a predetermined direction by approximately 45°. Further, the third polarization device may extract a linearly polarized light component having a third polarization direction from the light to be detected, the third polarization direction being obtained by rotating the first polarization direction in the predetermined direction by approximately 90°. Further, the fourth polarization device may extract a linearly polarized light component having a fourth polarization direction from the light to be detected, the fourth polarization direction being obtained by rotating the first polarization direction in the predetermined direction by approximately 135°.

The generation unit may generate the information regarding the degree of linear polarization for each of the groups on a basis of first to fourth pixel data respectively generated by the first to fourth pixels.

The generation unit may generate the information regarding the degree of linear polarization by executing fitting processing using a predetermined periodic function on a basis of the first to fourth pixel data.

The polarization control unit may include a polarization device disposed on an optical axis of the imaging unit, and a rotation mechanism unit capable of causing the polarization device to rotate relative to the imaging unit with reference to the optical axis of the imaging unit.

The rotation mechanism unit may cause the polarization device to relatively rotate to rotation positions of approximately 0°, approximately 45°, approximately 90°, and approximately 135° with reference to a predetermined rotation position. In this case, the generation unit may generate the information regarding the degree of linear polarization on a basis of a plurality of pieces of image data generated in accordance with rotation of the polarization device.

The generation unit may generate the information regarding the degree of linear polarization by executing fitting processing using a predetermined periodic function on a basis of the plurality of pieces of image data.

The rotation mechanism unit may cause the polarization device to rotate by at least 180° relative to the imaging unit with reference to a predetermined rotation position. In this case, the generation unit may generate the information regarding the degree of linear polarization on a basis of a plurality of pieces of image data generated in accordance with rotation of the polarization device.

The detection apparatus may further include an image generation unit that generates an image of the subject on a basis of the generated information regarding the degree of linear polarization.

The detection apparatus may further include a detection unit that detects an outer shape of the subject on a basis of the generated information regarding the degree of linear polarization.

The detection apparatus may further include a determination unit that determines a state of the subject on a basis of the generated information regarding the degree of linear polarization.

The illumination unit may include a polarization device on a rear surface side, which is disposed on the rear surface side of a disposition surface on which the subject is disposed, and a diffusion plate disposed on a side of the polarization device on the rear surface side opposite to the disposition surface.

A method of producing an electronic apparatus according to an embodiment of the present technology includes illuminating a subject with linearly polarized light, the subject being to be at least a part of the electronic apparatus.

A polarization state of light to be detected is controlled, the light to be detected travelling toward an imaging unit;

Information regarding a degree of linear polarization of the light to be detected is generated, on a basis of image data regarding the light to be detected, the polarization state of the light to be detected having been controlled, the image data regarding the light to be detected being generated by the imaging unit.

An outer shape of the subject is detected on a basis of the generated information regarding the degree of linear polarization, the subject is picked up, and the subject is moved to a predetermined position on a basis of a detection result thereof.

In this method of producing an electronic apparatus, a subject is illuminated with linearly polarized light, the subject being to be at least a part of the electronic apparatus, and a polarization state of light to be detected is controlled, the light to be detected travelling toward an imaging unit. Further, information regarding a degree of linear polarization of the light to be detected is generated, on a basis of image data regarding the light to be detected, the polarization state of the light to be detected having been controlled, the image data regarding the light to be detected being generated by the imaging unit. By using the information regarding the degree of linear polarization, it is possible to detect even the outer shape and the like of a subject having transparency with high accuracy. As a result, it is possible to improve the production accuracy of the electronic apparatus.

Advantageous Effects of Invention

As described above, in accordance with the present technology, it is possible to detect even the outer shape and the like of a subject having transparency with high accuracy. It should be noted that the effect described here is not necessarily limitative and may be any effect described in the present disclosure.

MODE(S) FOR CARRYING OUT THE INVENTION

Hereinafter, embodiments of the present technology will be described with reference to the drawings.

First Embodiment

[Configuration of Pickup Apparatus]

Figure 1:
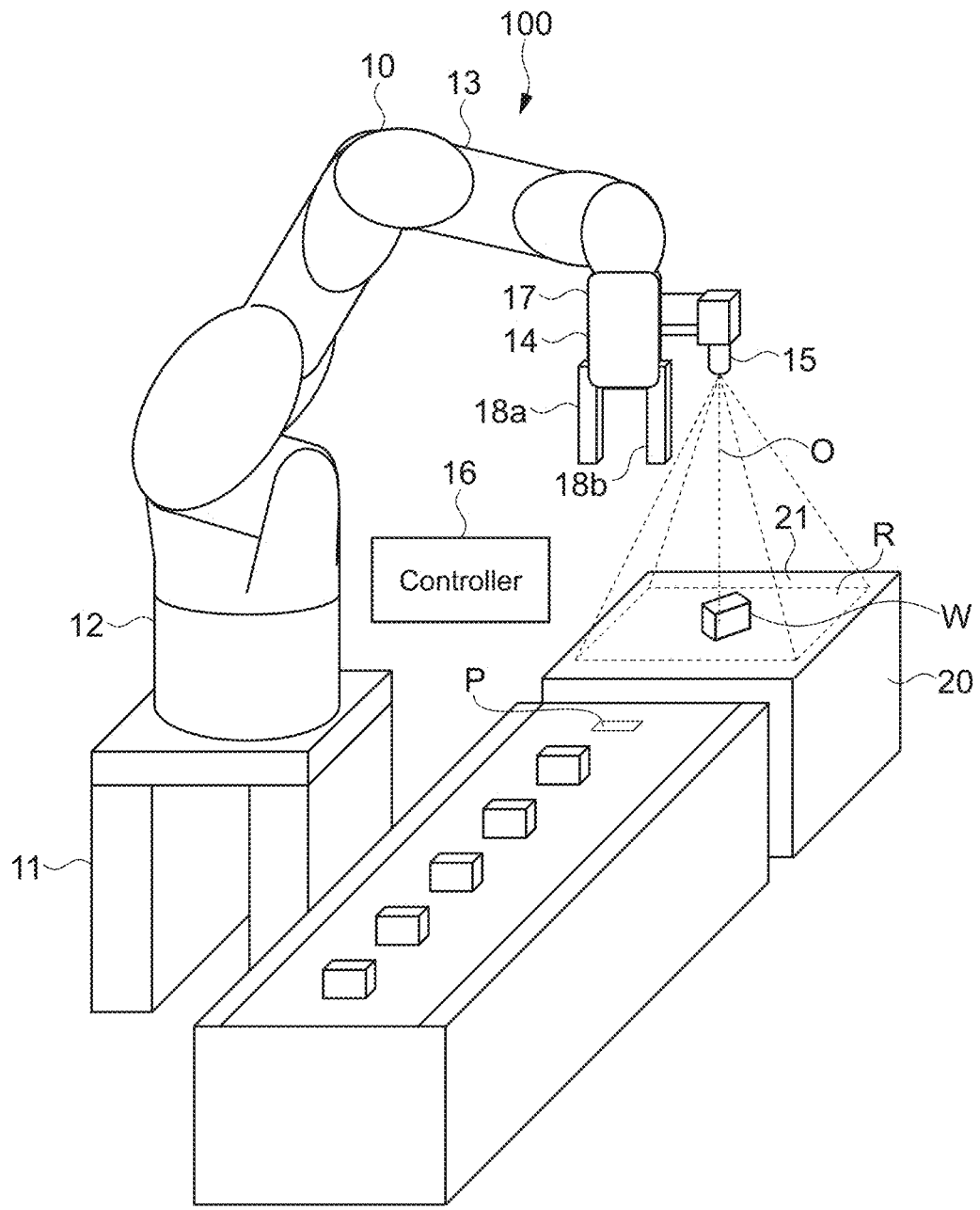
FIG. 1 is a schematic diagram showing a configuration example of a pickup apparatus according to a first embodiment.

FIG. 1 is a schematic diagram showing a configuration example of a pickup apparatus according to a first embodiment of the present technology. The pickup apparatus 100 is configured as, for example, an industrial robot that can be applied to a process of conveying components or a process of assembling parts in a production line of an electronic apparatus. As will be described in detail below, the pickup apparatus 100 is an apparatus using machine vision, and automation of the process has been realized.

The pickup apparatus 100 includes a robot arm 10 and a stage 20. In this embodiment, a workpiece W is disposed on a disposition surface 21 of the stage 20 by, for example, another pickup apparatus or an arbitrary transport mechanism. The pickup apparatus 100 picks up the workpiece W disposed on the disposition surface 21, and causes the workpiece W to move to a predetermined position P on an adjacent transport mechanism 5 in a predetermined posture. In this embodiment, the workpiece W corresponds to a subject.

In this embodiment, the workpiece W is formed of a resin material having transparency. The phrase "having transparency" includes both transparent and semi-transparent, and includes a colored form. It goes without saying that the present technology is not limited to a resin material and is applicable to also an arbitrary material.

As shown in FIG. 1, the robot arm 10 includes a support base 11, a drive unit 12, an articulated arm 13, a hand unit 14, a polarized camera 15, and a controller 16. The controller 16 is disposed, for example, inside the drive unit 12.

The support base 11 is disposed on the ground or the like, and supports the drive unit 12. The drive unit 12 drives the articulated arm 13 and the hand unit 14 on the basis of a control command transmitted from the controller 16. The drive unit 12 causes the articulated arm 13 to be expanded and contracted and to turn about a vertical axis (Z-axis), and the hand unit 14 to rotate, for example.

The articulated arm 13 includes, for example, a vertical articulated arm, but is not limited thereto. The articulated arm 13 may include an another type of articulated arm such as a horizontal articulated arm, a SCARA (Selective Compliance Assembly Robot Arm) articulated arm, a frog leg articulated arm, and a parallel link articulated arm.

The hand unit 14 includes a support unit 17 and two fingers 18a and 18b connected to the support unit 17. The two fingers 18a and 18b are configured to be capable of varying the distance between them, and are capable of sandwiching and holding the workpiece W in response to a control command from the controller 16.

The specific configuration of the hand unit 14 is not limited, and the number of fingers, the configuration for sandwiching the workpiece W, and the like may be arbitrarily designed. Further, another configuration or method for holding the workpiece W may be employed. For example, vacuum suction or adhesion may be executed.

The polarized camera 15 is connected to the support unit 17 of the hand unit 14. The polarized camera 15 is disposed so that the hand unit 14 extends downward along the vertical direction and an optical axis O extends in the vertical direction. The polarized camera 15 is capable of generating image data (image signal) of an imaging area R formed around the optical axis O. The position, orientation, and the like where the polarized camera 15 is disposed are not limited, and may be arbitrarily designed.

Figure 2:
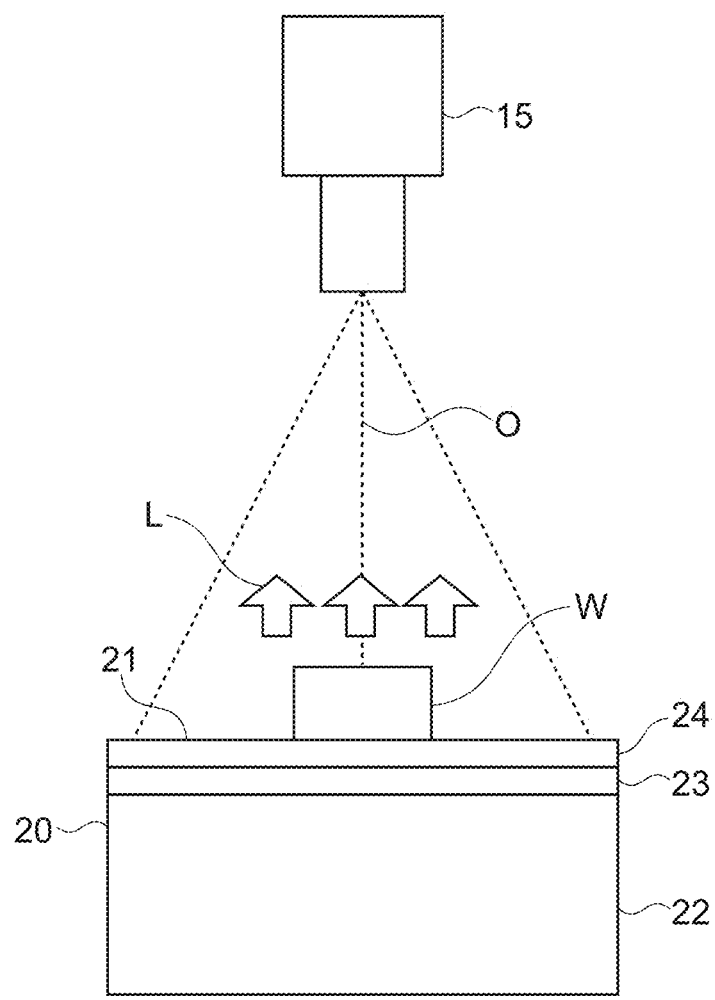
FIG. 2 is a diagram schematically showing a stage and a polarized camera shown in FIG. 1.

FIG. 2 is a diagram schematically showing the stage 20 and the polarized camera 15. The stage 20 includes a support base 22, a diffusion plate 23, and a polarizer 24. The support base 22 is disposed on the ground or the like. The diffusion plate 23 has a function of reflecting and diffusing light, and is disposed on the support base 22. As the diffusion plate 23, typically, an arbitrary white diffusion plate is used. However, another member may be used as the diffusion plate 23.

The polarizer 24 extracts, from incident light that has entered the polarizer 24, a linearly polarized light component in a polarization direction substantially equal to the polarization axis direction of the polarizer 24. That is, when light enters one surface of the polarizer 24, a linearly polarized light of the incident light in a polarization direction substantially equal to the polarization axis direction is output from the other surface. The specific configuration of the polarizer 24 is not limited. An arbitrary configuration such as a polarization device using a crystal material and a wire grid polarization device may be adopted.

In this embodiment, the surface of the polarizer 24 functions as the disposition surface 21 of the stage 20. It goes without saying that the present technology is not limited thereto. A transparent member or the like capable of maintaining the polarization state may be disposed on the surface of the polarizer 24, and the surface of the transparent member may function as the disposition surface 21.

In this embodiment, ambient light, e.g., an indoor light (fluorescent light) in the space in which the pickup apparatus 100 is disposed is reflected and diffused by the diffusion plate 23. The ambient light reflected and diffused by the diffusion plate 23 enters the polarizer 24, and the linearly polarized light component thereof is extracted. From the polarizer 24, linearly polarized light is output toward the disposition surface 21. By appropriately setting the polarization axis direction of the polarizer 24, it is possible to appropriately control the polarization direction of the linearly polarized light to be output to the disposition surface 21.

Among linearly polarized light beams to be output to the disposition surface 21, the light that passes through the workpiece W travels toward the polarized camera 15 after the polarization state thereof is disturbed by the birefringence property in the resin. Typically, linearly polarized light is converted into elliptically polarized light. The light that does not pass through the workpiece W travels toward the polarized camera 15 while the polarization state is substantially maintained. That is, substantially linearly polarized light enters the polarized camera 15.

In this embodiment, as shown in FIG. 2, light that travels from the disposition surface 21 on which the workpiece W is disposed toward the polarized camera 15 is light L to be detected. The light L to be detected includes both light that passes through the workpiece W and light that does not pass through the workpiece W.

In this embodiment, the diffusion plate 23 and the polarizer 24 realize an illumination unit that illuminates a subject with linearly polarized light. Further, the polarizer 24 corresponds to a polarization device on a rear surface side, which is disposed on the rear surface side of a disposition surface on which the subject is disposed. The diffusion plate 23 corresponds to a diffusion plate disposed on a side of the polarization device on the rear surface side opposite to the disposition surface.

Figure 3:
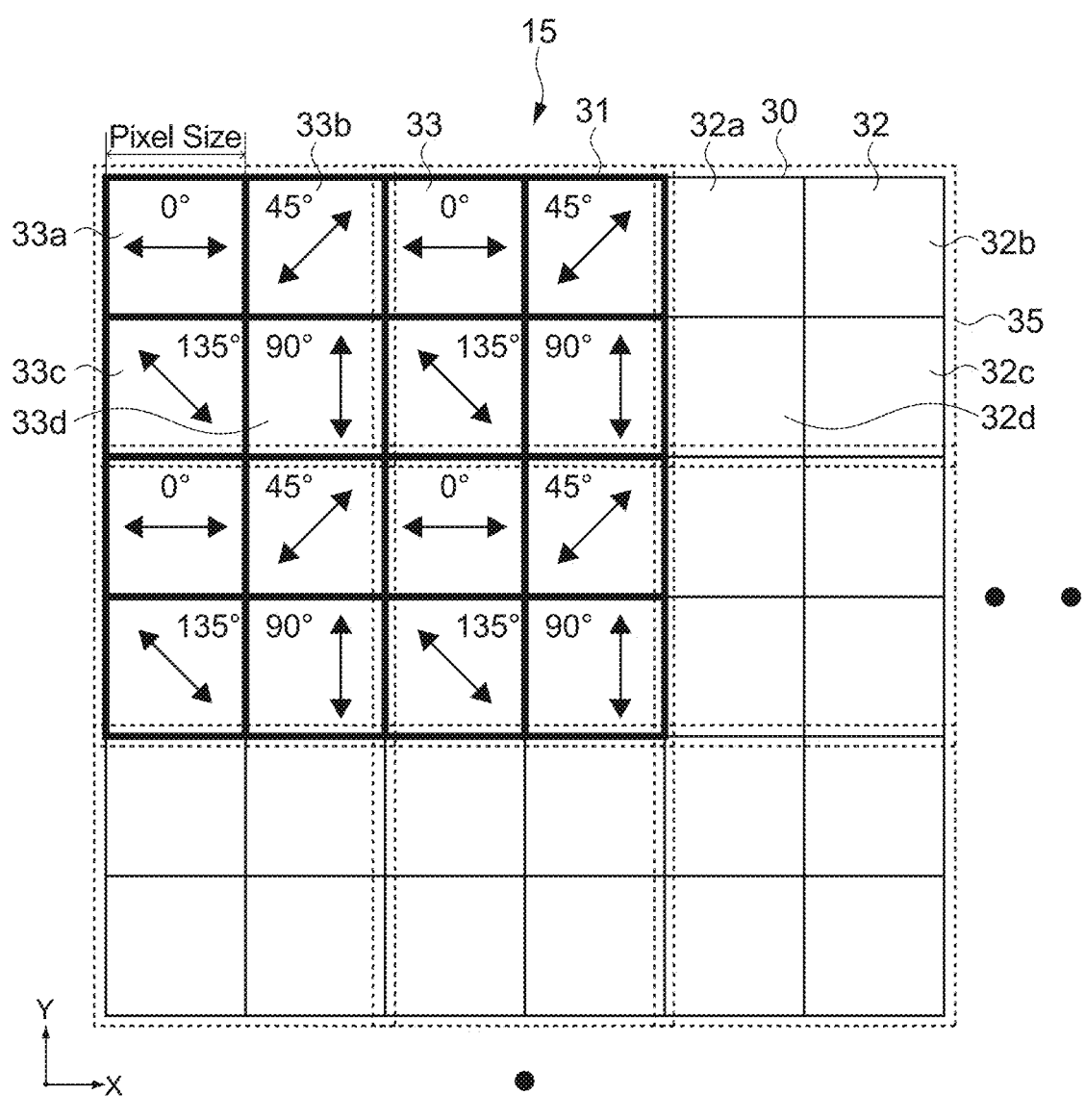
FIG. 3 is a diagram schematically showing a configuration example of the polarized camera.

FIG. 3 is a diagram schematically showing a configuration example of the polarized camera 15. The polarized camera 15 includes an image sensor (imaging device) 30 and a polarization control plate 31.

The image sensor 30 generates image data on the basis of incident light. As shown in FIG. 3, the image sensor 30 includes a plurality of pixels 32 each generating pixel data. A plurality of pieces of pixel data generated by the plurality of pixels 32 constitutes image data.

The number of the plurality of pixels 32 is not limited, and the image sensor 30 having an arbitrary number of pixels 32 may be used. Note that only a part of the pixels 32, which is located near the upper left end of the image sensor 30, is illustrated in FIG. 3.

As the image sensor 30, for example, a CMOS (Complementary Metal-Oxide Semiconductor) sensor, a CCD (Charge Coupled Device) sensor, or the like is used. Other image sensors may be used. In this embodiment, the image sensor 30 functions as an imaging unit.

The polarization control plate 31 is disposed in front of the image sensor 30. Therefore, the polarization state of the light L to be detected, which travels toward the image sensor 30, is controlled by the polarization control plate 31. In this embodiment, the polarization control plate 31 functions as a polarization control unit that controls the polarization state of light to be detected, which travels toward an imaging unit.

As shown in FIG. 3, the polarization control plate 31 includes a plurality of polarizers 33 each having a size substantially equal to the pixel size of each of the pixels 32 of the image sensor 30. The plurality of polarizers 33 is disposed corresponding to the plurality of pixels 32. That is, the polarization control plate 31 is configured so that one polarizer 33 is disposed in front of one pixel 32. Therefore, the number of the plurality of pixels 32 and the number of the plurality of polarizers 33 are equal to each other. The plurality of polarizers 33 can also be referred to as polarizer pixels.

In FIG. 3, in order to make the relationship between the plurality of pixels 32 and the plurality of polarizers 33 easier to understand, 16 polarizers 33 disposed in front of 16 pixels 32 located near the upper left end are illustrated. Then, illustration of the polarizers 33 disposed in front of the other pixels 32 is omitted. It goes without saying that actually, the polarizers 33 are disposed in front of all of the pixels 32.

In this embodiment, the plurality of pixels 32 of the image sensor 30 is classified into groups 35 each including a predetermined number of pixels 32. Then, for each of the classified groups 35, polarization control of the light L to be detected is executed.

Specifically, as the predetermined number of pixels 32, first to fourth pixels 32a to 32d arranged two by two in a lateral direction (x-direction) and a longitudinal direction (y-direction), which are two directions orthogonal to each other, are selected. These first to fourth pixels 32a to 32d form one group 35. Note that in FIG. 3, the groups 35 are represented by using chain lines.

In each of the groups 35, the upper left pixel 32 is the first pixel 32a and the upper right pixel 32 is the second pixel 32b. Further, the lower left pixel 32 is the third pixel 32c and the lower left pixel 32 is the fourth pixel 32d. It goes without saying that the present technology is not limited to this relationship. For example, the lower left pixel 32 may be the first pixel 32a.

As shown in FIG. 3, for each of the groups 35, first to fourth polarizers 33a to 33d are disposed corresponding to the first to fourth pixels 32a to 32d. The first polarizer 33a having the polarization axis direction is set to the lateral direction (x-direction) is disposed in front of the upper left first the pixel 32a.

The first polarizer 33a extracts a linearly polarized light component in the polarization direction (hereinafter, referred to as the first polarization direction) parallel to the lateral direction, from the light L to be detected, which travels toward the first pixel 32a. Therefore, linearly polarized light having the first polarization direction enters the first pixel 32a.

The second polarizer 33b in which the polarization axis direction is set to the direction obtained by rotating the lateral direction by approximately 45° in the left rotation direction is disposed for the upper right second pixel 32b. Therefore, the second polarizer 33b extracts a linearly polarized light component in the polarization direction (hereinafter, referred to as the second polarization direction) parallel to the direction obtained by rotating the lateral direction by approximately 45°, from the light L to be detected, which travels toward the second pixel 32b. As a result, linearly polarized light having the second polarization direction enters the second the pixel 32b.

Note that the second polarization direction corresponds to the polarization direction obtained by rotating the first polarization direction by approximately 45° in the left rotation direction. Further, the left rotation direction corresponds to a predetermined direction.

The third polarizer 33c in which the polarization axis direction is set to the direction obtained by rotating the lateral direction by approximately 90° in the left rotation direction is disposed for the lower right third pixel 32c. Therefore, the third polarizer 33c extracts a linearly polarized light component in the polarization direction (hereinafter, referred to as the third polarization direction) parallel to the direction obtained by rotating the lateral direction by approximately 90° in the left rotation direction, from the light L to be detected, which travels toward the third pixel 32c. As a result, linearly polarized light having the third polarization direction enters the third pixel 32c.

The fourth polarizer 33d in which the polarization axis direction is set to the direction obtained by rotating the lateral direction by approximately 135° in the left rotation direction is disposed for the lower left fourth pixel 32d. Therefore, the fourth polarizer 33d extracts a linearly polarized light component in the polarization direction (hereinafter, referred to as the fourth polarization direction) parallel to the direction obtained by rotating the lateral direction by approximately 135° in the left rotation direction, from the light L to be detected, which travels toward the fourth pixel 32d. As a result, linearly polarized light having the fourth polarization direction enters the fourth pixel 32d.

As described above, in this embodiment, the plurality of pixels 32 of the image sensor 30 is classified into the plurality of groups 35, and the first to fourth polarizers 33a to 33d are disposed for each group. Then, the first to fourth polarizers 33a to 33d extract linearly polarized light components having different polarization directions from the light L to be detected, and the linearly polarized light components are guided to the first to fourth pixels 32a to 32d in each of the groups 35. As a result, the polarization state of the light L to be detected, i.e., the polarization state of an imaging area P in which the workpiece W is disposed can be measured.

In this embodiment, the first to fourth polarizers 33a to 33d corresponds to a plurality of polarization devices that is disposed corresponding to the predetermined number of pixels for each of the classified groups and controls the polarization state of the light to be detected, which travels toward a corresponding one of the predetermined number of pixels.

The method of forming the groups 35 is not limited. The groups 35 may each be formed by an arbitrary number of pixels 32 having an arbitrary positional relationship. Further, to which directions the above-mentioned first to fourth polarization directions are set is also not limited, and may be arbitrarily set. Further, the specific configuration of the polarization control plate 31 in which the first to fourth polarizers 33a to 33d are periodically disposed is not limited, and may be arbitrarily designed.

The controller 16 comprehensively controls the operation of the robot arm 10. The controller 16 has a hardware configuration necessary for a computer, such as a CPU and a memory (RAM, ROM). The CPU loads a control program or the like stored in the memory or the like into the RAM and executes it, thereby executing various types of processing.

As the controller 16, for example, a PLD (Programmable Logic Device) such as an FPGA (Field Programmable Gate Array), or other devices such as an ASIC (Application Specific Integrated Circuit) may be used.

Figure 4:
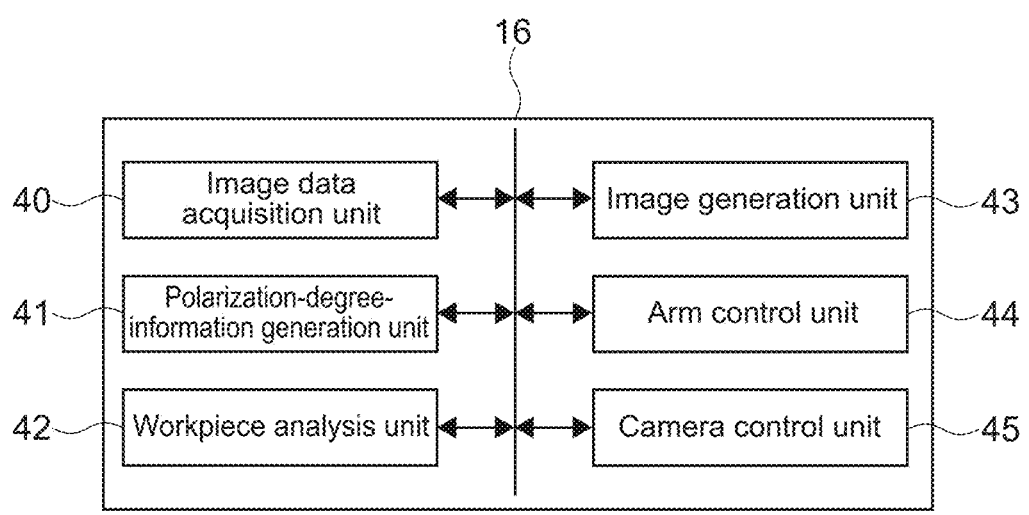
FIG. 4 is a block diagram showing a functional configuration example of a controller.

FIG. 4 is a block diagram showing a functional configuration example of the controller 16. In this embodiment, the CPU of the controller 16 executes the program according to this embodiment, thereby realizing functional blocks, i.e., an image data acquisition unit 40, a polarization-degree-information generation unit 41, a workpiece analysis unit 42, an image generation unit 43, an arm control unit 44, and a camera control unit 45. Then, these functional blocks execute the detection method according to this embodiment. Note that in order to realize the respective functional blocks, dedicated hardware such as an IC (Integrated Circuit) may be appropriately used.

The program is installed in the robot arm 10 via, for example, various recording media. Alternatively, the program may be installed via the Internet or the like.

[Method of Picking Up Workpiece]

Figure 5:
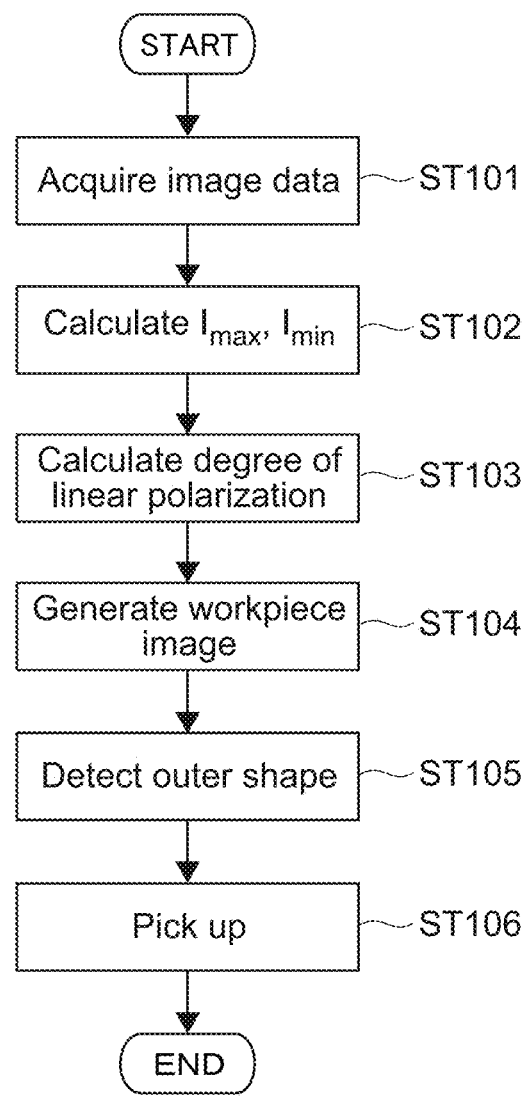
FIG. 5 is a flowchart showing an example of processing until a workpiece is picked up and moved to a predetermined position.

FIG. 5 is a flowchart showing an example of processing until the workpiece W is picked up and moved to the predetermined position P. First, the camera control unit 45 controls the imaging operation of the polarized camera 15. For example, imaging conditions such as zoom and exposure time are set, and the imaging operation is executed. Then, the image data acquisition unit 40 acquires image data generated by the polarized camera 15 (Step 101).

The polarization-degree-information generation unit 41 generates polarization-degree information. In this embodiment, polarization-degree information is generated for each of the groups 35 each including the first to fourth pixels 32*a* to 32*d*. First, in Step 102, the maximum luminance Imax and the minimum luminance Imin are generated as polarization-degree information.

Figure 6:
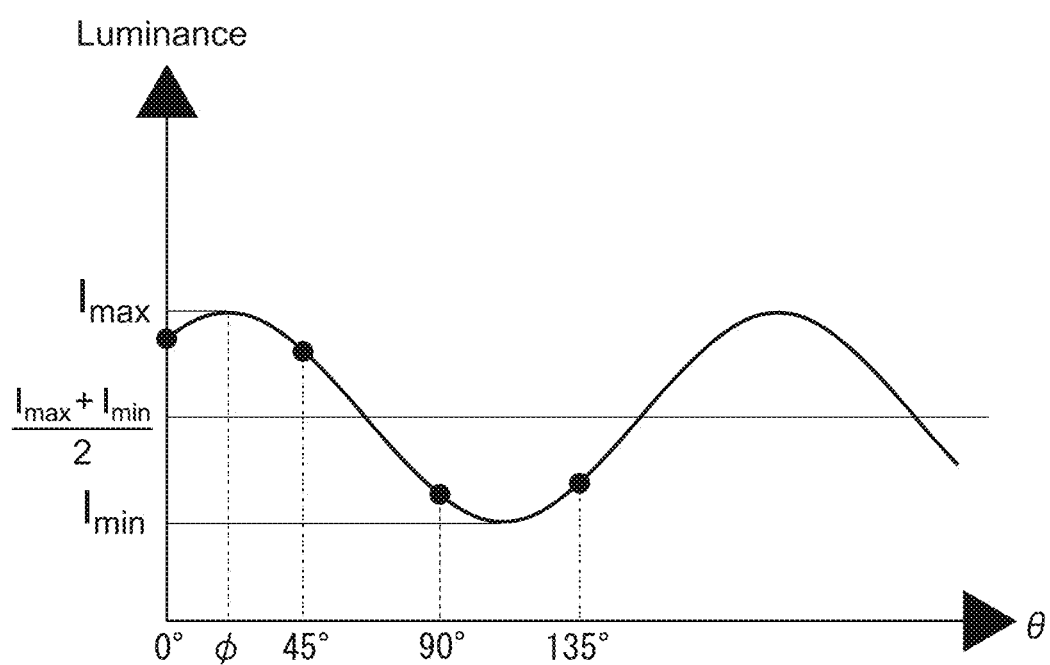
FIG. 6 is a graph for describing a maximum luminance Imax and a minimum luminance Imin.

FIG. 6 is a graph for describing the maximum luminance Imax and the minimum luminance Imin. For example, assumption is made that partially polarized light obtained by linearly polarized light and non-polarized light are synthesized enters one pixel of an image sensor. In this case, a polarizer is disposed so as to be perpendicular to the optical axis of incident light (or also the optical axis of a pixel), and the polarizer is rotated about the optical axis. Then, the luminance (intensity) of the incident light input to the pixel is represented by the following formula, and a graph illustrated in FIG. 6 is obtained.

$$I(\theta) = \frac{I_{max} + I_{min}}{2} + \frac{I_{max} - I_{min}}{2}\cos(2\theta - 2\phi) \quad \text{(Math. 1)}$$

As illustrated in FIG. 6, the maximum luminance Imax is the maximum value of luminance values acquired as pixel data when the polarizer is rotated. The minimum luminance Imin is the minimum value of luminance values acquired as pixel data when the polarizer is rotated. Note that φ shown in (Formula 1) is an angle of the polarization axis of the polarizer when the luminance value is the maximum luminance Imax.

The maximum luminance Imax corresponds to the maximum value of intensities of linearly polarized light components included in incident light. Further, the minimum luminance Imin corresponds to the minimum value of intensities of linearly polarized light components included in incident light. Imax and Imin can also be referred to as the polarization maximum value and the polarization minimum value, respectively. Further, the angle φ of the polarization axis of the polarizer when the luminance value is the maximum luminance Imax can be said to be the initial phase. It goes without saying that the shape of the graph changes depending on which direction the angle of the polarization axis is set with reference to.

In this embodiment, the luminance value of the linearly polarized light component in the first polarization direction, which enters the first pixel 32*a*, is first pixel data based on the light that has entered the first pixel 32*a*. The luminance value of the linearly polarized light component the second polarization direction, which enters the second pixel 32*b*, is second pixel data based on the light that has entered the second pixel 32*b*.

The luminance value of the linearly polarized light component in the third polarization direction, which enters the third pixel 32*c*, is third pixel data based on the light that has entered the third pixel 32*c*. The luminance value of the linearly polarized light component in the fourth polarization direction, which enters the fourth pixel 32*d*, is fourth pixel data based on the light that has entered the fourth pixel 32*d*.

The polarization-degree-information generation unit 41 executes fitting processing using a cosine function shown in (Formula 1), on the basis of the first to fourth pixel data. Then, the maximum luminance value Imax and the minimum luminance value Imin are generated.

For example, the angle θ is set with reference to the lateral direction that is the polarization axis direction of the first polarizer 33*a* shown in FIG. 3. That is, assumption is made that the angle θ increases along the left rotation direction with the lateral direction as 0°. In this case, the luminance value of 0° shown in FIG. 6 corresponds to the first pixel data, and the luminance value of 45° corresponds to the second pixel data. Further, the luminance value of 90° corresponds to the third pixel data, and the luminance value of 135° corresponds to the fourth pixel data. By executing fitting processing on the basis of these pieces of pixel data, it is possible to generate the maximum luminance value Imax and the minimum luminance value Imin as polarization-degree information regarding the group 35.

In this embodiment, the cosine function of (Formula 1) corresponds to a predetermined periodic function. Other periodic functions such as a trigonometric function may be used.

In Step 103, a degree of linear polarization p is generated as polarization-degree information (Step 103). The degree of linear polarization ρ is a parameter calculated by the following formula, and is an evaluation value according to the polarization state of the light L to be detected. The degree of linear polarization ρ is 1 (Imin=0) in the case where the light L to be detected is completely polarized light, and 0 (Imax=Imin) in the case where the light L to be detected is non-polarized light. The degree of linear polarization ρ approaches 1 as the polarization state of the light L to be detected is closer to perfect polarization.

$$\text{Degree of linear polarization } \rho = \frac{I_{max} - I_{min}}{I_{max} + I_{min}} \quad \text{(Math. 2)}$$

In this embodiment, the polarization-degree information corresponds to information regarding a degree of linear polarization of the light L to be detected. The information regarding the degree of linear polarization of the light L to be detected include both the maximum luminance Imax and minimum luminance Imin and the degree of linear polarization ρ. Further, the polarization-degree-information generation unit 41 functions as a generation unit.

The image generation unit 43 shown in FIG. 4 generates a workpiece image that is an image of the workpiece W (Step 104). In this embodiment, the polarization degree image of the workpiece W is generated on the basis of the degree of linear polarization ρ generated in Step 103.

Figure 7:
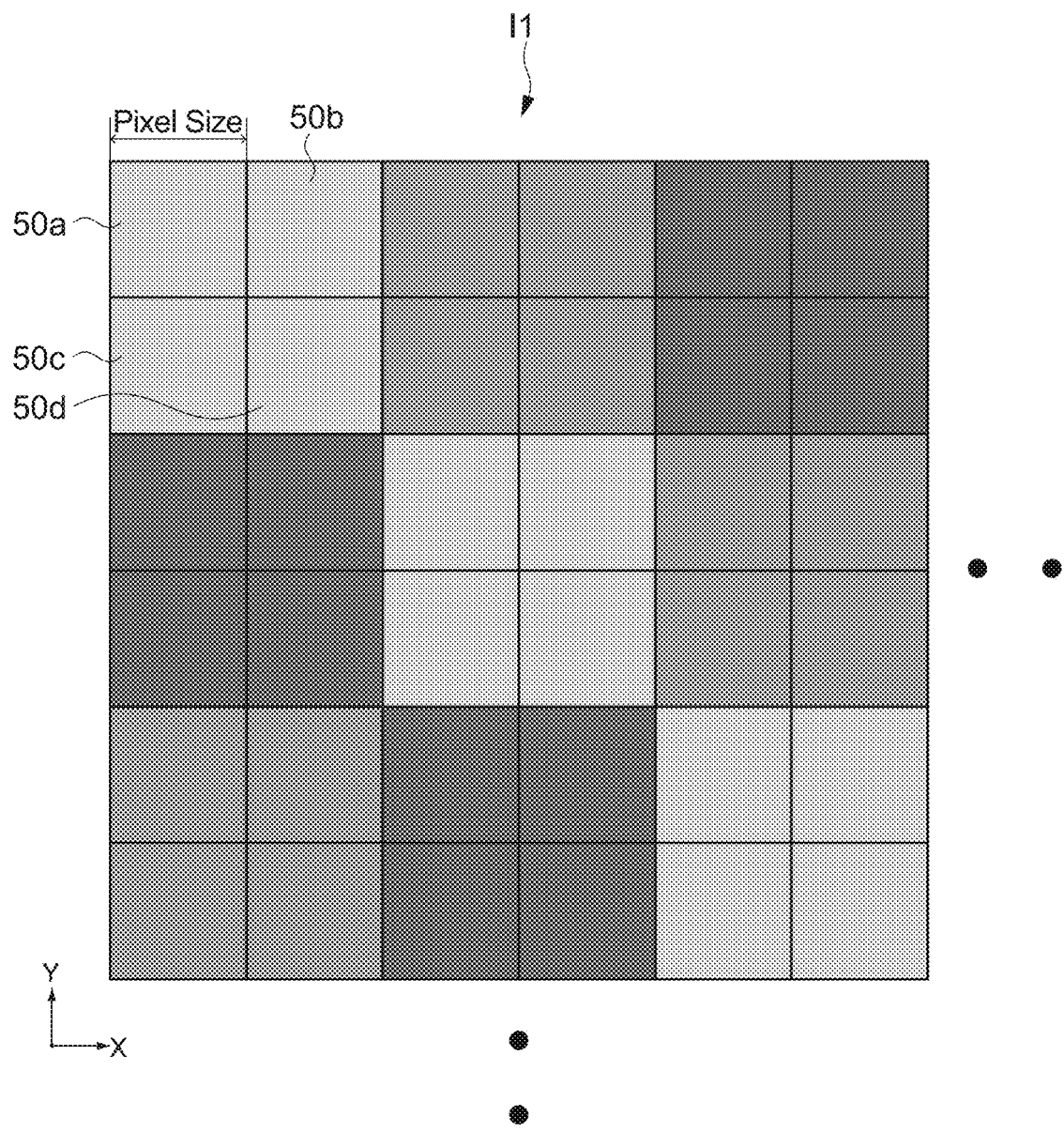
FIG. 7 is a schematic diagram for describing a configuration example of a polarization degree image.

FIG. 7 is a schematic diagram for describing a configuration example of the polarization degree image. The image generation unit 43 generates the degree of linear polarization ρ for each of the groups 35. Then, the image generation unit 43 calculates a display luminance value on the basis of the degree of linear polarization ρ thus generated. Typically, the display luminance value corresponding to the degree of linear polarization ρ is calculated by linearly associating the range (gradation range) of the display luminance value with the range of 0 to 1 of the degree of linear polarization ρ.

For example, in the case where the gradation range is 0 to 255, 0 is applied as the display luminance value for the degree of linear polarization being 0. For the degree of linear polarization being 1, 255 is applied as the display luminance value. For the range of the degree of linear polarization being 0 to 1, values in the range of 0 to 255 are applied as the display luminance values depending on the value of the degree of linear polarization. That is, the display luminance value is set to be larger as the degree of linear polarization ρ is larger.

The method of calculating the display luminance value on the basis of the degree of linear polarization ρ is not limited. For example, table information indicating the relationship between the degree of linear polarization ρ and the display luminance value may be used. Further, a threshold value relating to the degree of linear polarization ρ may be set. For example, in the case where the degree of linear polarization ρ is larger than a predetermined first threshold value, a high display luminance value (e.g., the maximum luminance value) is assigned. In the case where the degree of linear polarization ρ is smaller than a second threshold value, a low display luminance value (e.g., the minimum luminance value) is assigned. As a result, it is possible to detect the outer shape and the like of the workpiece W with high accuracy.

It goes without saying that the relationship between the degree of linear polarization ρ and the display luminance value may be set to be opposite. That is, for the degree of linear polarization being 0, 255 is applied as the display luminance value. For the degree of linear polarization being 1, 0 is applied as the display luminance value. Even in such a case, it is possible to emphasize the edge of the workpiece W and detect the outer shape and the like with high accuracy.

In this embodiment, the degree of linear polarization ρ is generated for each of the groups 35 including the first to fourth pixels 32a to 32d, and the same display luminance value corresponding to the degree of linear polarization ρ is calculated for each of the groups 35 similarly. Therefore, as shown in FIG. 7, four pixels 50a to 50d corresponding to the first to fourth pixels 32a to 32d have the same display luminance value in a polarization degree image I1. It goes without saying that the respective display luminance values of the four pixels 50a to 50d may be corrected on the basis of the display luminance values of an adjacent group 35 (four pixels 50a to 50d). That is, gradation correction or the like may be executed so that the four pixels 50a to 50d are different from each other.

Figure 8A:
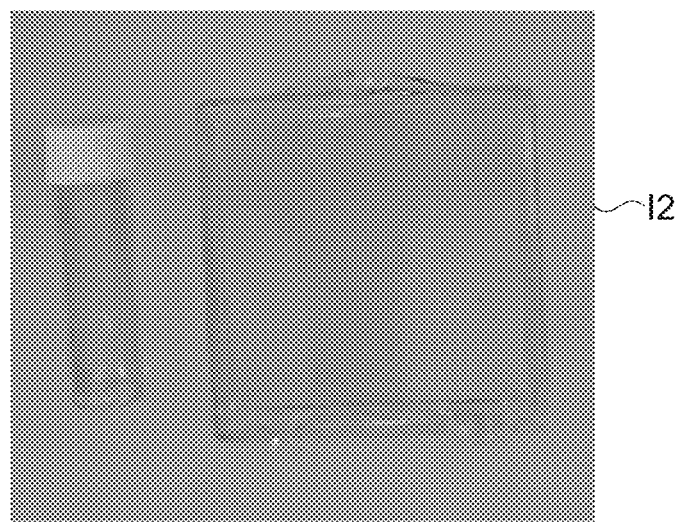
FIGS. 8A, 8B, and 8C are photographs for describing an example of a workpiece image.
Figure 8B:
Figure 8C:
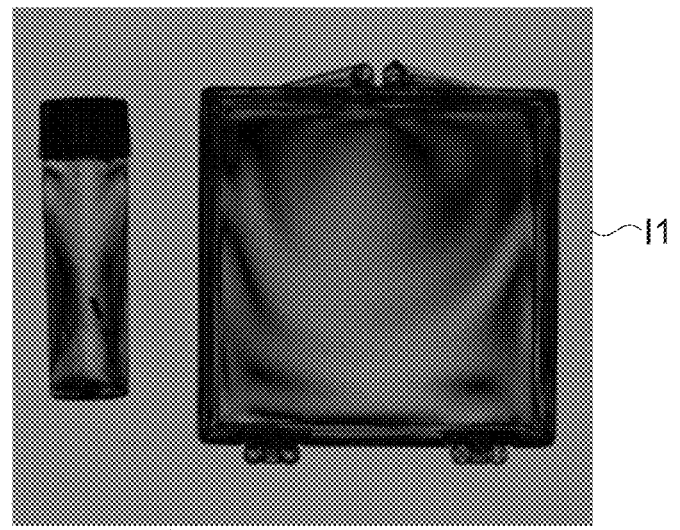

FIGS. 8A, 8B, and 8C are photographs for describing an example of a workpiece image. Here, as the workpiece W, a container formed of a transparent resin having a cylindrical shape (lid portion is white) and a container formed of a transparent resin having a thin plate shape were imaged.

FIG. 8A is a photograph showing a color image I2 of the workpiece W. FIG. 8B is a photograph showing a monochrome image I3 of the workpiece W. In both the color image I2 and the monochrome image I3, the reflection/transmission amount of illumination light is substantially equal to each other between the background and the workpiece W. Therefore, it is difficult to obtain a clear contrast between the background and the workpiece W and detect the outer shape of the workpiece W.

FIG. 8C is a photograph showing the polarization degree image I1 of the workpiece W. In the polarization degree image I1, the background is expressed by the light L to be detected, which does not pass through the workpiece W. That is, since the background is expressed by light having a high degree of linear polarization ρ, it is displayed with a high display luminance value. As a result, the background is displayed in a bright color close to white. It goes without saying that in the case where the maximum luminance value can be applied, the background is displayed in white.

The workpiece W is expressed by light whose polarization state has been disturbed by the birefringence characteristics in the resin. That is, since the workpiece W is expressed by light having a low degree of linear polarization ρ, it is displayed with a low display luminance value. As a result, the workpiece W is displayed in colors from gray to black.

A portion having low transparency (e.g., lid of the container having a cylindrical shape) of the workpiece W is expressed by non-polarized ambient light reflected at the portion. Therefore, the degree of linear polarization ρ is substantially zero, and the portion is expressed in substantially black.

By generating the polarization degree image I1 based on the degree of linear polarization ρ of the light L to be detected as described above, it is possible to obtain a clear contrast between the background and the workpiece W and realize edge sharpening and emphasis. As a result, it is possible to detect the outer shape of the workpiece W with high accuracy. Note that the information regarding the degree of linear polarization includes also the polarization degree image I1.

The workpiece analysis unit 42 detects the outer shape of the workpiece W on the basis of the polarization degree image I1 (Step 105). The method of detecting the outer shape is not limited. For example, an arbitrary outer-shape detection algorithm such as detection of a contrast edge including binarization processing or the like may be used. Further, a machine learning algorithm using a DNN (Deep NeuralNetwork), or the like may be used. For example, by using AI (artificial intelligence) that performs deep learning, it is possible to improve the detection accuracy.

A pickup operation is performed on the basis of information regarding the detected outer shape (Step 106). For example, the arm control unit 44 transmits a control command so that a predetermined position of the workpiece W can be sandwiched between the fingers 8a and 8b shown in FIG. 1. Further, a control command for moving the workpiece W to the predetermined position P in an appropriate posture is transmitted. Since the outer shape of the workpiece W has been detected on the basis of the polarization degree image I1 with high accuracy, it is possible to execute the pickup operation with very high accuracy.

It goes without saying that information regarding the posture, center of gravity, orientation, position, and the like of the workpiece W may be calculated on the basis of the information regarding the outer shape, and the operation of picking up the workpiece W may be executed on the basis of the calculated information. Note that it is also possible to directly detect the outer shape by, for example, a machine learning algorithm, on the basis of the degree of linear polarization ρ for each of the groups 35 calculated in Step 103.

Further, in this embodiment, the workpiece analysis unit 42 is capable of calculating the retardation (also referred to as the retardation amount) of the workpiece W on the basis of the polarization-degree information. The retardation is a parameter defined by the product of the birefringence and thickness of the workpiece W, and can be calculated by the following formula using the maximum luminance Imax and the minimum luminance Imin.

$$\text{Retardation} = \frac{\lambda \tan^{-1} \sqrt{I_{min}/I_{max}}}{\pi} \quad \text{(Math. 3)}$$

λ is light source wavelength

π is pi

The retardation has a correlation with the internal stress (strain) of the workpiece W. Therefore, by calculating the retardation, it is possible to detect the distribution of the internal stress (strain), and the like. As a result, it is possible to determine the state of the workpiece W, and perform the inspection of the workpiece W. For example, in the case where the distribution of the internal stress (strain) is different from that of another workpiece W, it can be determined that the workpiece is defective. Further, in the case where the internal stress (strain) is continuously in an abnormal state, it can also be determined that a defect has occurred on the production line.

As described above, in this embodiment, both detection of the outer shape of the workpiece W and determination of the state of the workpiece W can be executed by the workpiece analysis unit 42. The workpiece analysis unit 42 functions as a detection unit and a determination unit.

As described above, in the pickup apparatus 100 according to this embodiment, the workpiece W is illuminated with linearly polarized light, and the polarization state of the light L to be detected, which travels toward the image sensor 30, is controlled. Further, information regarding the degree of linear polarization of the light L to be detected is generated on the basis of image data of the light L to be detected, the polarization state of the light L to be detected being controlled. By using the information regarding the degree of linear polarization, it is possible to detect even the outer shape, the retardation, and the like of the workpiece W having transparency with high accuracy.

Further, in this embodiment, the polarized camera 15 including the image sensor 30 and the polarization control plate 31 is used. As a result, it is possible to acquire information regarding the polarization state of the light L to be detected by, for example, one time of imaging, and acquire polarization-degree information. As a result, it is possible to reduce the processing time.

Further, in this embodiment, the diffusion plate 23 and the polarizer 24 are disposed on the rear surface side of the disposition surface 21, and the function of backlight is realized. As a result, it is possible to observe the workpiece W using only ambient light. Further, also a portion that does not cause light from the back to pass therethrough, such as the lid of the cylindrical container shown in FIG. 8C, is displayed to be distinguishable from the background on the basis of non-polarized ambient light emitted from the front. As a result, it is possible to detect the outer shape and the like of the workpiece W with high accuracy.

For example, by using also a camera capable of capturing a monochrome image, a monochrome image can be captured. Then, it is possible to observe the state from the front (from the camera side) of the portion that does not cause light from the back to pass therethrough. For example, in the case where a label or the like is attached to the front of the workpiece W, the front of the label is displayed in black in a polarization degree image, but the content or the like described in the label can be checked in a monochrome image. Note that in FIG. 8B, the entire image is dark, but the state of the front of the workpiece W can be sufficiently observed by setting the state of ambient light, the exposure state, and the like.

It goes without saying that the configuration of the illumination unit that illuminates a subject with linearly polarized light is not limited. A light source such as a lamp may be disposed on the rear surface side of the disposition surface 21, and the polarizer 24 may be disposed on the optical axis thereof. Further, in the case where a laser light source or the like capable of emitting linearly polarized laser light is used, the polarization device such as the polarizer 24 may be omitted to constitute an illumination unit.

In the visual inspection apparatus described in Patent Literature 1, first and second polarization plates are disposed on the optical path between a light source and an imaging apparatus so as to have a crossed Nicols relationship. Then, an inspection target is disposed between the first and second polarization plates. As a result, a difference occurs between the amount of light that does not pass through the inspection target and the amount of light that passes through the inspection target, and a grayscale image in which the background portion is dark and the inspection target is bright is generated. By binarizing this grayscale image, it is possible to accurately inspect the outer shape of the inspection target.

Here, in the case where the transparency of the inspection target is low or there is a partially opaque portion, light from the light source is blocked, and thus, the amount of light that passes through the second polarization plate and enters the imaging apparatus is reduced. As a result, also the background and the inspection target are displayed dark, which makes it difficult to accurately inspect the outer shape.

In the present technology, a polarization degree image is generated on the basis of the degree of linear polarization. Therefore, regarding a part having low transparency or a portion that is partially opaque, an image is displayed on the basis of non-polarized light (ambient light). Therefore, a large difference occurs in the display luminance from the background displayed on the basis of light having a high degree of linear polarization, and these parts are displayed to be sufficiently distinguished from the background. As a result, it is possible to sufficiently detect the outer shape and the like of the workpiece W.

In this embodiment, the pickup apparatus 100 is configured as an embodiment of the detection apparatus according to the present technology. Here, the present technology is applied with the workpiece W as a subject to be at least a part of an electronic apparatus, e.g., a component in the production line of the electronic apparatus. In this case, the workpiece W that is held by the pickup apparatus 100 and moved to the predetermined position P of the transport mechanism 5 travels on the production line, and finally, an electronic apparatus is produced. That is, the pickup operation by the pickup apparatus 100 described with reference to FIG. 5 and the like can be regarded as a process included in the method of producing an electronic apparatus. Since it is possible to execute the pickup operation with high accuracy as described above, it is possible to improve the production accuracy of the electronic apparatus.

Note that the process, field, and the like to which the detection apparatus according to the present technology can be applied are not limited. That is, the present technology is not limited to the case of picking up and moving the workpiece W or the like, and can be applied to detection of the outer shape of the workpiece W, determination of various states, and the like. Further, the detection apparatus according to the present technology can be used not only in the field of producing electronic apparatuses but also in other arbitrary fields. That is, the present technology can be applied to an apparatus or the like other than the industrial robot such as a robot arm. Also the subject to be detected is not limited to a component of the like to be a part of the electronic apparatus, and the present technology can be applied to other arbitrary subjects.

Second Embodiment

A pickup apparatus according to a second embodiment of the present technology will be described. In the following description, the description of the configuration and operation in the pickup apparatus 100 similar to those described in the above-mentioned embodiment will be omitted or simplified.

Figure 9:
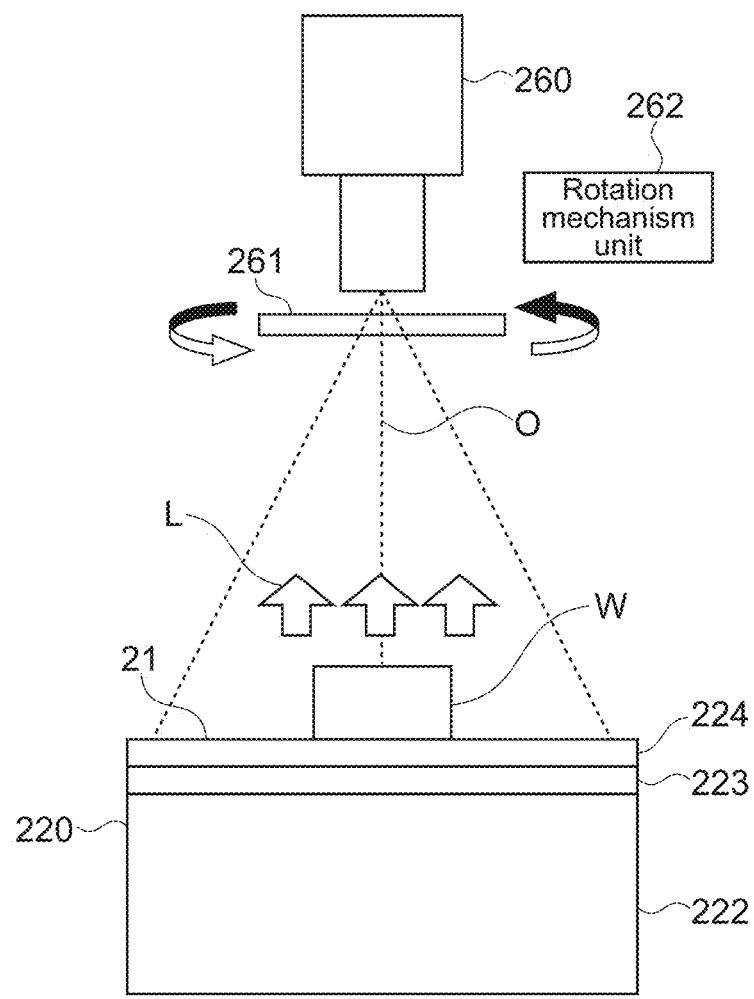
FIG. 9 is a schematic diagram showing a configuration example of a pickup apparatus according to a second embodiment.

FIG. 9 is a schematic diagram showing a configuration example of a pickup apparatus 200 according to this embodiment. The pickup apparatus 200 includes a stage 220, a camera 260, a polarizer 261, and a rotation mechanism unit 262. The stage 220 has a configuration substantially equal to that of the stage 20 described in the first embodiment, and includes a support base 222, a diffusion plate 223, and a polarizer 224.

The camera 260 is a monochrome camera, and for example, an arbitrary monochrome camera that includes an image sensor such as a CMOS sensor and a CCD sensor may be used. The image sensor functions as an imaging unit.

The polarizer 261 is disposed on an optical axis of the camera 260, and extracts a linearly polarized light component having a polarization direction substantially equal to the polarization axis direction from the light L to be detected, which travels toward the camera 260. The polarizer 261 corresponds to a polarization device, and an arbitrary configuration may be adopted.

The rotation mechanism unit 262 is capable of causing the polarizer 261 to rotate relative to the camera 260 with reference to the optical axis O of the camera 260. In this embodiment, the polarizer 261 is caused to rotate relate to the camera 260. It goes without saying that the camera 260 may rotate relative to the polarizer 261 about the optical axis O.

The specific configuration of the rotation mechanism unit 262 is not limited. For example, the rotation mechanism unit 262 can be realized by an arbitrary actuator mechanism including a stepping motor, a gear mechanism, and the like. It goes without saying that another arbitrary configuration may be adopted.

In this embodiment, the polarizer 261 and the rotation mechanism unit 262 function as a polarization control unit that controls the polarization state of light to be detected, which travels toward an imaging unit.

When observing the workpiece W, the rotation mechanism unit 262 causes the polarizer 261 to rotate. Then, polarization-degree information is generated foe each pixel on the basis of a plurality of pieces of image data generated in accordance with the rotation of the polarizer 261.

For example, the polarization device is caused to rotate to rotation positions of approximately 0°, approximately 45°, approximately 90°, and approximately 135° with reference to a predetermined rotation position. Then, in each pixel, pixel data at the rotation positions of approximately 0°, approximately 45°, approximately 90°, and approximately 135° is acquired. As described with reference to FIG. 6, fitting processing using the cosine function shown in the (formula 1) is executed on the basis of the four pieces of pixel data.

As a result, it is possible to calculate the maximum luminance value Imax, the minimum luminance value Imin, the degree of linear polarization ρ, and the retardation for each pixel. Therefore, it is possible to apply the display luminance corresponding to the degree of linear polarization ρ for each pixel, and generate the polarization degree image I1 with high resolution. As a result, it is possible to execute detection of the outer shape of the workpiece W, determination of the state of the workpiece W, and the like with high accuracy.

Further, the polarization device 261 may be caused to rotate by at least 180° relative to the camera 260 with reference to a predetermined rotation position, and polarization-degree information may be generated on the basis of a plurality of image data generated in accordance with the rotation.

For example, the maximum value of the luminance values detected in accordance with the rotation of 180° or more in each pixel is the maximum luminance value Imax. Further, the minimum value of the luminance values detected in accordance with the rotation of 180° or more is the minimum luminance value Imin. The degree of linear polarization ρ and the retardation can be calculated for each pixel on the basis of the maximum luminance value Imax and the minimum luminance value Imin. Since polarization-degree information can be calculated without executing fitting processing, it is possible to reduce the processing load and the like.

Other Embodiments

The present technology is not limited to the above-mentioned embodiments, and other various embodiments can be realized.

In the above, in order to calculate the maximum luminance value Imax and the minimum luminance value Imin by fitting processing, the intensity of the linearly polarized light component at each of four angles (four polarization directions) such as 0°, 45°, 90°, and 135° has been calculated. The present technology is not limited thereto, and the intensity of each of other numbers of linearly polarized light components, e.g., two, three, or five linearly polarized light components, may be calculated. Further, the angle interval in the case where a plurality of angles is set may be arbitrarily set.

In the above, an example in which the controller 16 as illustrated in FIG. 1 and FIG. 4 is configured and disposed inside the robot arm 10 or the like has been described. The present technology is not limited thereto. For example, the controller 16 may be disposed in the polarized camera 15, the monochrome camera, or the like that generates image data of the workpiece W. Further, a computer such as a PC may be separated used, and may have the function of the controller 16. In this case, the PC or the like is connected to the robot arm 10.

Further, the functions of the respective blocks of the controller 16 may be divided and provided in a plurality of devices or a computer. For example, the polarized camera 15 may execute up to the process of generating polarization-degree information, and the robot arm 10, the PC, or the like may execute the analysis of the workpiece W. Such a configuration may be adopted.

Further, all or some of the functions of the respective blocks of the controller 16 may be executed by a cloud server. Further, the detection method according to the present technology may be executed in cooperation of a plurality of computers capable of communicating with each other.

The detection method according to the present technology is applicable to a configuration of cloud computing in which one function is shared by a plurality of apparatuses via a network and processed jointly.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) A detection apparatus, including:
an imaging unit that generates image data on a basis of incident light;
an illumination unit that illuminates a subject with linearly polarized light;
a polarization control unit that controls a polarization state of light to be detected, the light to be detected travelling toward the imaging unit; and
a generation unit that generates information regarding a degree of linear polarization of the light to be detected, on a basis of image data regarding the light to be detected, the polarization state of the light to be detected having been controlled, the image data regarding the light to be detected being generated by the imaging unit.

(2) The detection apparatus according to (1), in which the information regarding the degree of linear polarization includes at least one of a maximum value of intensity of linearly polarized light components included in the light to be detected, a minimum value of intensity of the linearly polarized tight components included in the light to be detected, or the degree of linear polarization.

(3) The detection apparatus according to (1) or (2), in which
the imaging unit includes a plurality of pixels each generating pixel data,
the polarization control unit classifies the plurality of pixels into a plurality of groups, and controls the polarization state of the light to be detected for each of the classified groups, each of the plurality of groups including a predetermined number of pixels, and
the generation unit generates the information regarding the degree of linear polarization for each of the classified groups.

(4) The detection apparatus according to (3), in which the polarization control unit includes a plurality of polarization devices that is disposed corresponding to the predetermined number of pixels for each of the classified groups and controls the polarization state of the light to be detected, which travels toward a corresponding one of the predetermined number of pixels.

(5) The detection apparatus according to (3), in which each of the plurality of polarization devices extracts a linearly polarized light component having a different polarization direction with respect to incident light.

(6) The detection apparatus according to (5), in which the predetermined number of pixels include first to fourth pixels arranged two by two in directions orthogonal to each other, and the plurality of polarization devices includes first to fourth polarization devices arranged corresponding to the first to fourth pixels.

(7) The detection apparatus according to (6), in which
the first polarization device extracts a linearly polarized light component having a first polarization direction from the light to be detected,
the second polarization device extracts a linearly polarized light component having a second polarization direction from the light to be detected, the second polarization direction being obtained by rotating the first polarization direction in a predetermined direction by approximately 45°,
the third polarization device extracts a linearly polarized light component having a third polarization direction from the light to be detected, the third polarization direction being obtained by rotating the first polarization direction in the predetermined direction by approximately 90°, and
the fourth polarization device extracts a linearly polarized light component having a fourth polarization direction from the light to be detected, the fourth polarization direction being obtained by rotating the first polarization direction in the predetermined direction by approximately 135°.

(8) The detection apparatus according to (6) or (7), in which
the generation unit generates the information regarding the degree of linear polarization for each of the groups on a basis of first to fourth pixel data respectively generated by the first to fourth pixels.

(9) The detection apparatus according to (8), in which the generation unit generates the information regarding the degree of linear polarization by executing fitting processing using a predetermined periodic function on a basis of the first to fourth pixel data.

(10) The detection apparatus according to (1) or (2), in which
the polarization control unit includes a polarization device disposed on an optical axis of the imaging unit, and a rotation mechanism unit capable of causing the polarization device to rotate relative to the imaging unit with reference to the optical axis of the imaging unit.

(11) The detection apparatus according to (10), in which
the rotation mechanism unit causes the polarization device to relatively rotate to rotation positions of approximately 0°, approximately 45°, approximately 90°, and approximately 135° with reference to a predetermined rotation position, and
the generation unit generates the information regarding the degree of linear polarization on a basis of a plurality of pieces of image data generated in accordance with rotation of the polarization device.

(12) The detection apparatus according to (11), in which
the generation unit generates the information regarding the degree of linear polarization by executing fitting processing using a predetermined periodic function on a basis of the plurality of pieces of image data.

(13) The detection apparatus according to (10), in which
the rotation mechanism unit causes the polarization device to rotate by at least 180° relative to the imaging unit with reference to a predetermined rotation position, and the generation unit generates the information regarding the degree of linear polarization on a basis of a plurality of pieces of image data generated in accordance with rotation of the polarization device.

(14) The detection apparatus according to any one of (1) to (13), further including an image generation unit that generates an image of the subject on a basis of the generated information regarding the degree of linear polarization.

(15) The detection apparatus according to any one of (1) to (14), further including a detection unit that detects an outer shape of the subject on a basis of the generated information regarding the degree of linear polarization.

(16) The detection apparatus according to any one of (1) to (15), further including a determination unit that determines a state of the subject on a basis of the generated information regarding the degree of linear polarization.

(17) The detection apparatus according to any one of (1) to (16), in which the illumination unit includes a polarization device on a rear surface side, which is disposed on the rear surface side of a disposition surface on which the subject is disposed, and a diffusion plate disposed on a side of the polarization device on the rear surface side opposite to the disposition surface.

(18) A method of producing an electronic apparatus, including:

illuminating a subject with linearly polarized light, the subject being to be at least a part of the electronic apparatus;

controlling a polarization state of light to be detected, the light to be detected travelling toward an imaging unit;

generating information regarding a degree of linear polarization of the light to be detected, on a basis of image data regarding the light to be detected, the polarization state of the light to be detected having been controlled, the image data regarding the light to be detected being generated by the imaging unit; and detecting an outer shape of the subject on a basis of the generated information regarding the degree of linear polarization, picking up the subject and moving the subject to a predetermined position on a basis of a detection result thereof.

REFERENCE SIGNS LIST

L light to be detected
O optical axis
W workpiece
10 robot arm
15 polarized camera
16 controller
20,220 stage
21 disposition surface
23, 223 diffusion plate
24, 224 polarizer
30 image sensor
31 polarization control plate
32 pixel
33 polarizer
35 group
40 image data acquisition unit
41 polarization-degree-information generation unit
42 workpiece analysis unit
43 image generation unit
100, 200 pickup apparatus
260 camera
261 polarization device
262 rotation mechanism unit

The invention claimed is:

1. A detection apparatus, comprising:
an image sensor configured to generate image data based on incident light on the image sensor;
a diffusion plate;
a polarizer, wherein the diffusion plate and the polarizer are configured to illuminate a subject with linearly polarized light, wherein the incident light includes the linearly polarized light;
a polarization control plate configured to control a polarization state of the incident light; and
circuitry configured to:
generate information regarding a degree of linear polarization of the incident light, based on the image data regarding the incident light and the control of the polarization state of the incident light,
wherein the information regarding the degree of linear polarization includes a maximum value of intensity of linearly polarized light components included in the incident light and a minimum value of the intensity of the linearly polarized light components; and
determine a state of the subject based on the maximum value of the intensity of the linearly polarized light components, the minimum value of the intensity of the linearly polarized light components, and a wavelength of the incident light.

2. The detection apparatus according to claim 1, wherein the information regarding the degree of linear polarization further includes the degree of linear polarization.

3. The detection apparatus according to claim 1, wherein the circuitry is further configured to generate an image of the subject based on a basis of the generated information regarding the degree of linear polarization.

4. The detection apparatus according to claim 1, wherein the circuitry is further configured to detect an outer shape of the subject based on the generated information regarding the degree of linear polarization.

5. The detection apparatus according to claim 1, wherein the polarizer is on a rear surface side of a disposition surface of a stage,
the subject is on the disposition surface, and
the diffusion plate is on a side of the polarizer on the rear surface side opposite to the disposition surface.

6. The detection apparatus according to claim 1, wherein the image sensor includes a plurality of pixels,
each of the plurality of pixels is configured generate pixel data, the polarization control plate is further configured to:
classify the plurality of pixels into a plurality of groups, and control the polarization state of the incident light for each of the plurality of groups,
each of the plurality of groups includes a specific number of pixels of the plurality of pixels, and
the circuitry is further configured to generate the information regarding the degree of linear polarization for each of the plurality of groups.

7. The detection apparatus according to claim 6, wherein the polarization control plate includes a plurality of polarizers corresponding to the specific number of pixels for each of the plurality of groups, and the polarization control plate is further configured to control the polarization state of the incident light, which travels toward a corresponding one of the specific number of pixels.

8. The detection apparatus according to claim 7, wherein each of the plurality of polarizers is configured to extract a linearly polarized light component of the linearly polarized light components having a different polarization direction with respect to the incident light.

9. The detection apparatus according to claim 8, wherein
the specific number of pixels includes a first pixel, a second pixel, a third pixel, and a fourth pixel arranged two by two in orthogonal directions, and
the plurality of polarizers includes a first polarizer, a second polarizer, a third polarizer, and a fourth polarizer arranged corresponding to the first pixel, the second pixel, the third pixel, and the fourth pixel.

10. The detection apparatus according to claim 9, wherein
the first polarizer is configured to extract a first linearly polarized light component of the linearly polarized light components having a first polarization direction from the incident light,
the second polarizer is configured to extract a second linearly polarized light component of the linearly polarized light components having a second polarization direction from the incident light to be detected,
the second polarization direction is obtained by a first rotation of the first polarization direction in a specific direction by approximately 45°,
the third polarizer is configured to extract a third linearly polarized light component of the linearly polarized light components having a third polarization direction from the incident light,
the third polarization direction is obtained by a second rotation of the first polarization direction in the specific direction by approximately 90°,
the fourth polarizer is configured to extract a fourth linearly polarized light component of the linearly polarized light components having a fourth polarization direction from the incident light, and
the fourth polarization direction is obtained by a third rotation of the first polarization direction in the specific direction by approximately 135°.

11. The detection apparatus according to claim 9, wherein the circuitry is further configured to generate the information regarding the degree of linear polarization for each of the plurality of groups based on first pixel data, second pixel data, third pixel data, and fourth pixel data respectively generated by the first pixel, the second pixel, the third pixel, and the fourth pixel.

12. The detection apparatus according to claim 11, wherein
the circuitry is further configured to generate the information regarding the degree of linear polarization by execution of fitting processing using a specific periodic function, and
the execution of the fitting processing is based on the first pixel data, the second pixel data, the third pixel data, and the fourth pixel data.

* * * * *